Figure 7:
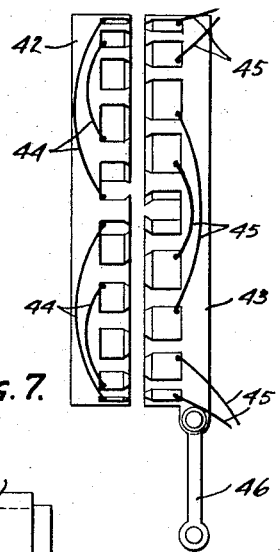

June 23, 1959 W. KOBER 2,892,144
ELECTRIC GENERATOR AND REGULATOR
Filed Feb. 17, 1958 3 Sheets-Sheet 1

INVENTOR.
WILLIAM KOBER
BY
Bean Brooks, Buckley & Bean.
ATTORNEYS

INVENTOR.
WILLIAM KOBER
BY
Bean, Brooks, Buckley + Bean.
ATTORNEYS

June 23, 1959 W. KOBER 2,892,144
ELECTRIC GENERATOR AND REGULATOR
Filed Feb. 17, 1958 3 Sheets-Sheet 3

INVENTOR:
WILLIAM KOBER
BY:
Beau, Brooke, Buckley & Beau,
ATTORNEYS.

United States Patent Office 2,892,144
Patented June 23, 1959

2,892,144

ELECTRIC GENERATOR AND REGULATOR

William Kober, Fairport, N.Y.

Application February 17, 1958, Serial No. 715,706

6 Claims. (Cl. 322—49)

This application is a continuation-in-part of my pending application Ser. No. 595,572, filed June 29, 1956, now Patent 2,824,275, granted February 18, 1958, which is a continuation of my earlier application Ser. No. 216,713, now abandoned, filed March 21, 1951.

In my Patents 2,719,931, granted October 4, 1955, and 2,784,332, granted March 5, 1957, the general method of constructing a permanent magnet alternator with an axial air gap, and the use of an adjustable axial air gap as a means for controlling the voltage of an alternator having a permanent magnet or other type field, have been described.

It is an object of this invention to provide means and structures whereby an axial air gap generator will adjust itself to maintain its terminal voltage substantially constant under varying loads.

It is another object to obtain said inherent adjustment to substantially constant terminal voltage over a range of load power factors.

It is a principal object of the invention to provide means and structures so that an inherent adjustment to substantially constant terminal voltage will take place over a range of changes in load and load power factor applied together or in any combination. The methods and structures that produce these and other objects of the invention are set forth in the following specifications and drawings. In the drawings Figs. 1, 2 and 3 show the armature and field of a dynamo electric generator of the type used in applying the invention.

Figure 4:
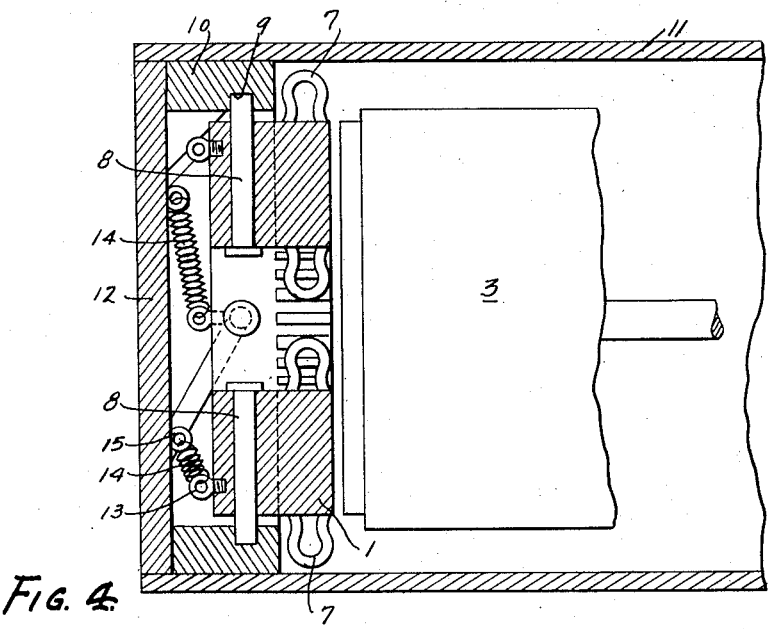
Figure 5:
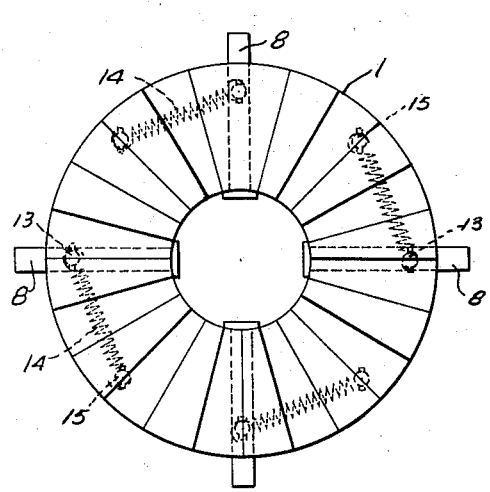
Figure 6:
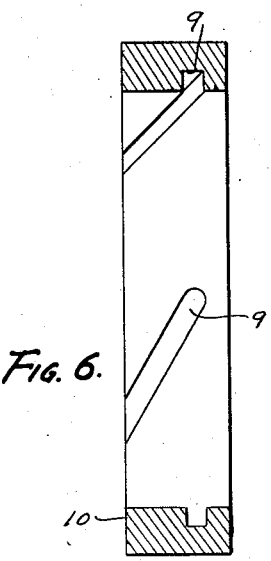

Fig. 4 is an axial sectional view of a generator showing the armature mounted for resiliently resisted limited rotation in response to change of torque produced by change in electrical load; Fig. 5 is an elevation of the armature but with the windings omitted; and Fig. 6 is a sectional view of the grooved support for the armature.

Figure 8:
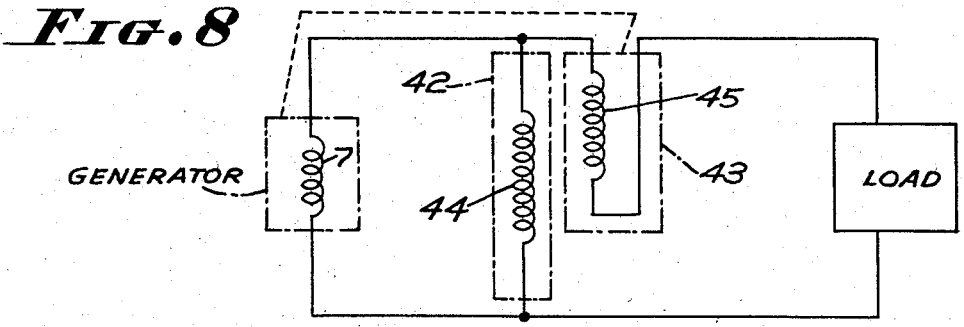
Figure 10:
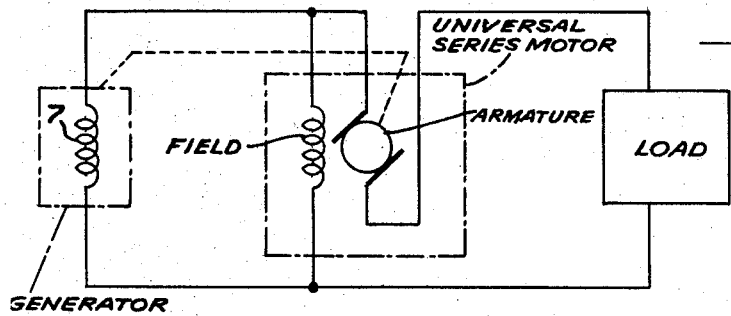
Figure 9:
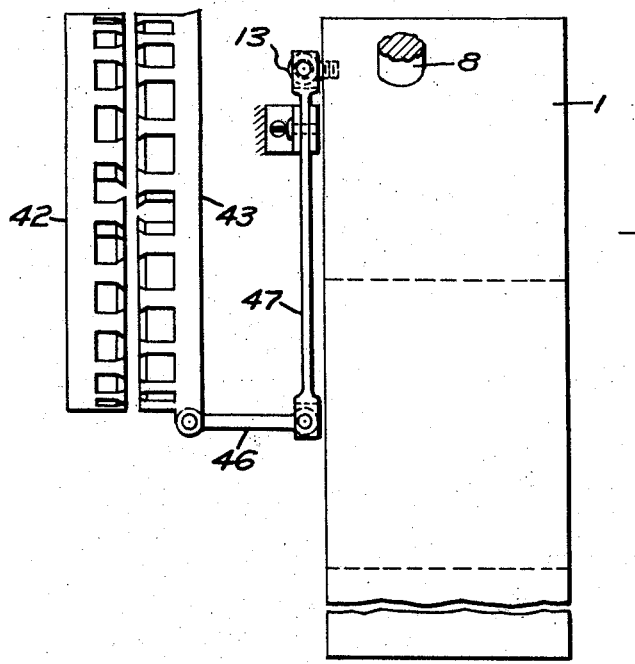

Fig. 7 shows schematically a dynamometer structure in which both movable and stationary members carry windings for producing a force for control of generator terminal voltage with variable load power factor; Fig. 8 is a wiring diagram illustrating the electrical connection between the generator of Fig. 4 and the control dynamometer of Fig. 7; Fig. 9 schematically illustrates the physical connection therebetween; and Fig. 10 is a wiring diagram corresponding to that of Fig. 8 but with a modified control dynamometer.

Figure 1:
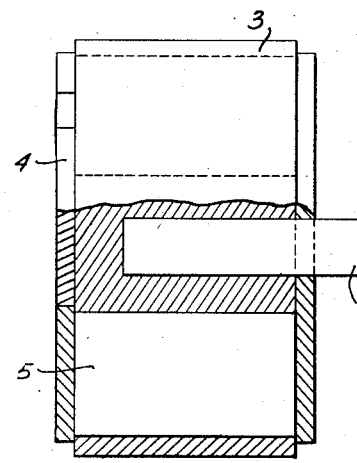
Figure 2:
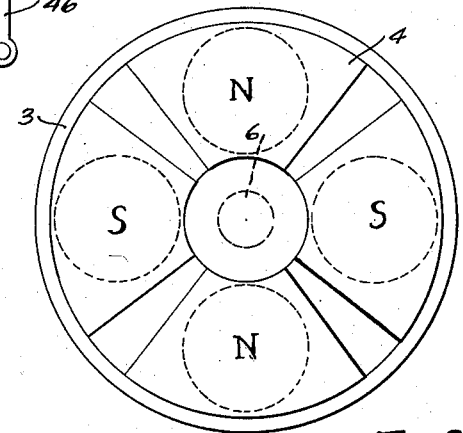
Figure 3:
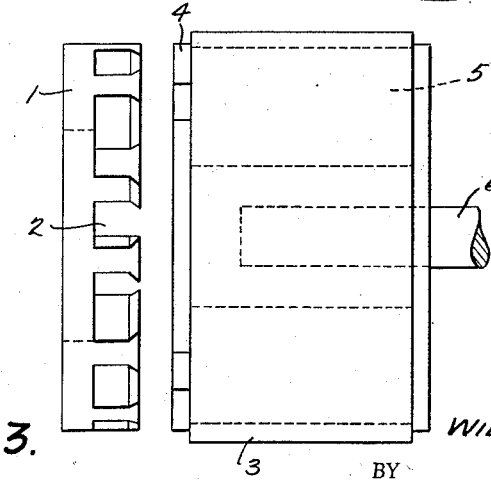

Figs. 1, 2 and 3 show the general construction of the rotor 3 and stator 1 in a permanent magnet generator using an axial air gap. Four poles are shown, but the adaptation to any number of poles is obvious. The slots 2 in stator 1 provide a place for the winding 7 (Fig. 4). The rotating field 3 contains permanent magnets 5 and pole pieces 4 facing the stator. The rotor turns on shaft 6.

There are several forces acting between the rotor and the stator, and an understanding of them is necessary to an understanding of the invention.

First, there is the force of attraction between the pole face and the stator across the air gap. This force is given by the formula:

$$F = \frac{B^2 A}{8\pi}$$

where B is the flux density, and A the area involved. All quantities are in c.g.s. units. Since B is not always uniform at all points on the pole face, the term $B^2$ is more accurately the mean square of B over the variable flux density areas involved. To give an idea of the magnitudes involved, a 4 pole generator having a flux per pole of 600,000 lines, and weighing about 90 lbs., will have a force of attraction between rotor and stator of 1,500 lbs.

The second force to be considered is that developed as an additional attraction or repulsion by armature currents. When the armature current is exactly in phase with the generated voltage, the poles formed on the face of the stator are displaced exactly 90 electrical degrees from those of the rotor, and each section where repulsion (N against N or S against S) exists is balanced by an equal section where attraction exists (N against S). This is true of a polyphase winding in which armature reaction is constant in magnitude and moves smoothly in rotation exactly in step with the rotor field. When a polyphase system has an unbalanced load, or in a single phase generator, there are alternate attractions and repulsions, however, these average to zero over a full cycle, so that, except for a tendency to produce vibrations, no resultant force exists.

It should be noted here that for the load current to be in exact phase with the generated voltage requires a power factor slightly less than unity, and leading. A unity power factor load is in phase with the terminal voltage, but this lags the generated voltage because it contains as a component the inductive drop in the synchronous reactance of the generator, which always causes a lagging displacement. Thus, a unity power factor load produces in part the effects of departure in phase between generated voltage and load current to be discussed immediately following.

If the armature current lags the generated voltage by 90°, the poles formed on the armature directly oppose those of the field. This will produce a force of repulsion, which can more clearly be understood in terms of the resulting reduction in B, and the reduction in force that follows. It will be seen that this force depends greatly on a number of specific factors in the design of the generator.

If the armature current leads the generated voltage by 90°, the poles formed on the armature assist those of the field. A resulting force of attraction results.

The third force to be considered is a rotational force exerted on the stator by the rotor. Some amount of force exists even at no load, resulting from hysteresis and eddy current drag by the field on the stator, and from air friction across the small air gap. These forces are fairly small, however, and in addition relatively constant. A large rotational force results from the application of a power drain to the generator output. This is most conveniently viewed as being the back torque or power absorption by the stator which appears in electrical energy. If the winding and associated losses in the generator as well as the output load are taken into account, this view is quite accurate. Assuming an efficiency of 90 percent, (10% internal losses), the output power P in kw. and the rotational torque T on the stator are given by the relation $$T = \frac{P}{n} \times \frac{33,000}{2\pi \times 0.746 \times 0.9} = \frac{P}{n} \times 7,823$$

where $n$ is the revolutions per minute. This equation is only approximate, since at low power factors the internal losses increase, and the efficiency drops, so that the torque is not entirely proportional to output power, but has some tendency to follow the current value.

In a generator built according to Figs. 1–3, the voltage generated in the armature winding 7 can be varied over a large range by a small change in the air gap. An increase in the air gap decreases the voltage, and vice versa.

By the methods of the invention now to be described, the forces above analyzed can be used to produce motions of the armature which will affect the air gap in such a way as to oppose the change in voltage caused by the load. In this way, these changes can be kept small.

When the load increases, the output voltage drops, so that the desired motion is such as to reduce the air gap. However, the force of attraction between rotor and stator diminishes, and if the stator were to be mounted on springs, the motion would be in the opposite direction to that desired. The torque on the stator, however, is quite large, usually representing a greater force at the mean armature radius than the change in attraction above noted. According to the invention, the stator is so mounted that this torque produces a motion tending to close the air gap. This torque-produced motion is resisted by an elastic support, which is adjustable so that the degree of air gap, motion, and hence voltage adjustment, is controlled to the desired value.

Figs. 4, 5 and 6 show one way in which this result can be realized. In Fig. 5, four pins 8 are shown driven and anchored in the stator, and projecting beyond it a suitable distance. Although four pins are shown for purposes of illustration, any number from three up is obviously useful. These pins fit into four angled slots 9 in the stator support 10, which is in turn fastened to the housing 11. The slots 9 are better shown in Fig. 6. The slots are closed at the front end to stop the motion of the stator before it can come in actual contact with the rotor. They are open at the rear to permit easy assembly, but in working position the back plate 12 prevents the air gap from exceeding a predetermined maximum amount.

Springs 14 are fastened between pins 13 in the stator 15 and in the back plate, to restrain the rotary motion of the stator. The tension in these springs is adjustable by rotation of the back plate 12, which is mounted so that it can be rotated and locked in a number of positions. By adjustment of these springs, the stator is so controlled that its rotation is roughly proportional to the torque on the stator. As the stator rotates, the slots slide it toward the rotor, reducing the air gap by the desired amount.

The slope of slot 9 is of importance in securing the best results. Since the application of load reduces the magnetic pull of the rotor on the stator, producing through the inclined plane action of the screw 8, 10 a tendency to rotate in the incorrect direction, the torque must be given a definite mechanical advantage to overcome this. Since the change in magnetic pull is normally less than the torque force at the radius of the pins, any slope under 45° is practical. As the slope is reduced, the rotary motion of the stator increases.

It will be obvious that the direct engagement of pins 8 with the slots 9 may be replaced by a fully developed multiple thread, with the female part cut in 10 and the male part cut in a collar in turn mounted to stator 1. The male and female threads may also be interchanged between these parts.

The stator also can be supported by means of links or inclined planes, and/or the rotor can be mounted for torque responsive motion, as described and illustrated in my application Ser. No. 595,572, now Patent 2,824,275, and speed compensating motion also can be provided as disclosed therein.

When the power factor varies over a wide range, additional force producing devices are required to correct for the resulting voltage changes. Such devices are provided by the present invention.

A generator having a substantially constant effective resistance R and synchronous reactance X may be treated as a perfect source coupled to its output through elements R and X in series. Generators not using field control, as those contemplated in this invention, normally have such substantially constant values of R and Z. In standard vector notation, $$\bar{E} - \bar{V} = \bar{I}(R+jX)$$
$$= (I_R - jI_x)(R+jX)$$

where $I_R$ is the component of I in phase with V, and $I_x$ is the component of I 90 degrees out of phase with the lagging V.

Multiplying $$\bar{E} - \bar{V} = I_R R + I_x X + j(I_R X - I_x R)$$

The imaginary term (coefficient of $j$) acts mostly to rotate vector E in respect to vector V, and has little effect on its magnitude for normal values of $I_R$, $I_x$, R and X. Hence, these may be ignored in practice, whence $$\bar{E} - \bar{V} = I_R R + I_x X$$

This means that the drop in the generator $\bar{E} - \bar{V}$ (which is to be made up by voltage control), is the "in phase" current $I_R$ times the effective resistance R plus the "wattless" current $I_x$ times the reactance X. Hence, when variable power factor loads are to be corrected for, which means differing values of $I_R$ and $I_x$, each term must be corrected for individually.

Power output is given by $$VI_R$$

and hence the torque is proportional to $I_R$, since V is substantially constant. Thus it is obvious that the torque devices above described and comprising the subject matter of my Patent No. 2,824,275 will take care of this drop when properly adjusted.

To compensate for $I_x X$ an added torque must be developed which is proportional to $I_x$.

Such a force can be developed by, for example, constructing an electrodynamometer in which the field coil develops a flux 90° out of phase with V, and the current coil a current in phase with I, the load current. One form of such a device is shown in Fig. 7. Here part 42 is the field, and is stationary, while part 43 is movable, and is connected to the part it drives by link 46 as illustrated in Fig. 9. Suitable devices, not shown, are provided to permit part 43 to move relative to part 42, and spaced only a short distance from it, but without permitting actual contact therebetween, the working faces of parts 42 and 43 remaining parallel. The winding 44 of the control dynamometer field coil is highly inductive, and if the generator terminal voltage V is impressed across it, the resulting magnetic flux will be very close to 90° lagging in phase behind V. Winding 45 of the control dynamometer armature 43 carries the generator load current I, either directly or through an intermediate transformer, not illustrated. The foregoing electrical connections are illustrated in Fig. 8, and a rotary force is produced on part 43 which is then proportional to $VI_x$, and hence to $I_x$. This rotary force is applied to the stator or rotor, as the case might be, of the generator to cause a control adjustment tending to maintain the generator output voltage substantially constant with variations in the generator load power factor.

A similar result can be obtained, in the form of rotary motion, by using a standard "universal" series motor, reconnected as illustrated in Fig. 10. The motor field terminals are brought out and connected to the generator voltage V. The motor field then replaces part 42 of Fig. 7. The brush terminals from the motor armature then carry current I, directly or through a transformer. The motor armature replaces part 43 of Fig. 7.

The rotary pull developed by these dynamometers can be applied to the structure of Figs. 4, 5 and 6, for example, by connecting link 46 of Fig. 7 to pin 13 on the stator 1, as illustrated in Fig. 9, to rotate the stator in a direction to secure the necessary voltage adjustment. If desired, a multiplying leverage can intervene as illustrated at 47, to secure the correct amount of force to eliminate the $I_xX$ drop. Normally, the power factor responsive control force produced by the control dynamometer is added to the electrical load responsive internal torque force on the stator or rotor, as the case may be, but it is subtracted therefrom when the generator load power factor passes through unity to become leading.

Having fully disclosed and completely described my invention, and its mode of operation, what I claim as new is:

1. In an electric generator having an armature, a field producing structure, an air gap separating said armature and said field structure, at least one of said armature and said field structure being mounted for movement relative to the other thereof in a direction to vary said air gap, and means operable to produce a force proportional to the wattless electrical output power component developed by the generator and operatively connected to said one of said armature and said field structure to automatically cause such relative motion of said armature and said field structure to vary said air gap and thus compensate for the change in voltage caused by the wattless current in the synchronous reactances of the generator.

2. In an electric generator of the axial air gap type having an armature, field producing means, and means mounting one of said armature and said field producing means for rotation about an axis, said armature and said field producing means having working surfaces spaced apart in the direction of said axis to provide an axial air gap therebetween, means supporting one of said armature and said field producing means for movement relative to the other thereof along said axis, and additional means producing a force proportional to the reactive component of the output current of said generator, said additional means being operatively connected to said one of said armature and said field producing means and automatically operable to cause such relative motion and thereby vary the length of said air gap in a direction to produce a desired generator output characteristic with variations in load power factor.

3. A generator as set forth in claim 2, together with means elastically resisting such relative motion.

4. In an electric generator of the axial air gap type having an armature, field producing means, and means mounting one of said armature and said field producing means for rotation about an axis, said armature and said field producing means having working surfaces spaced apart in the direction of said axis to provide an axial air gap therebetween, means supporting one of said armature and said field producing means for movement along said axis toward and away from the other thereof to vary the length of said air gap automatically in response to variations in the internal torque force therebetween produced by variations in the electrical load on said generator, said supporting means being arranged so that the length of said air gap is varied in a direction maintaining the terminal voltage of said generator substantially constant with variations in the electrical load thereon, and means producing a force proportional to the reactive component of the generator output current, said last-named means being operatively connected to said one of said armature and said field producing means and being automatically operable to produce such relative motion in a direction to maintain the terminal voltage substantially constant with variations in the power factor of such load.

5. A dynamoelectric generator having a stator, a rotor mounted for rotation about an axis, said stator and said rotor having working surfaces spaced apart in the direction of said axis to provide an axial air gap therebetween, means mounting one of said stator and said rotor for rolling movement along and about said axis toward and away from the other thereof, and means producing a force proportional to the reactive component of the generator output current and operatively connected to said one of said stator and said rotor for so moving the same automatically to vary the length of said air gap in a direction producing a desired generator output characteristic with variations in the load power factor.

6. A generator as set forth in claim 5 wherein said rotor comprises permanent magnet field producing means, and said stator is mounted for such rolling movement.

References Cited in the file of this patent

UNITED STATES PATENTS

| 614,608 | Cantono | Nov. 22, 1898 |
| 1,268,545 | Chapman | June 4, 1918 |
| 1,453,523 | McCullough | Nov. 9, 1948 |
| 2,824,275 | Kober | Feb. 18, 1958 |